United States Patent [19]

Tokumitsu

[11] Patent Number: 4,927,230
[45] Date of Patent: May 22, 1990

[54] OPTICAL SWITCH ARRAY PROVIDED WITH A MASK HAVING OPENINGS OF A PREDETERMINED PATTERN AND SHUTTERS CORRESPONDING TO THE PATTERN

[75] Inventor: Jun Tokumitsu, Sagamihara, Japan
[73] Assignee: Canon Kabushiki Kaisha, Tokyo, Japan
[21] Appl. No.: 231,004
[22] Filed: Aug. 11, 1988

[30] Foreign Application Priority Data

Aug. 19, 1987 [JP] Japan .................................. 62-206038

[51] Int. Cl.[5] .............................................. G02B 6/04
[52] U.S. Cl. ................................. 350/96.24; 350/96.22
[58] Field of Search ................ 350/96.20, 96.22, 96.24

[56] References Cited

U.S. PATENT DOCUMENTS

| | | | |
|---|---|---|---|
| 4,601,537 | 7/1986 | Saccocio | 350/96.24 |
| 4,688,891 | 8/1987 | Carratt et al. | 350/96.24 |
| 4,730,895 | 3/1988 | Siedband et al. | 350/96.24 |
| 4,859,012 | 8/1989 | Cohn | 350/96.24 |

*Primary Examiner*—William L. Sikes
*Assistant Examiner*—Robert E. Wise
*Attorney, Agent, or Firm*—Fitzpatrick, Cella, Harper & Scinto

[57] ABSTRACT

An optical switch array includes N (N being 2 or greater integer) light-emitting elements arranged in a predetermined direction and each emitting a light independently modulated in accordance with an input signal, a mask having N×M (M being 2 or greater integer) segments arranged in the form of a matrix in the predetermined direction and a direction perpendicular thereto, some of the segments transmitting therethrough or reflecting the lights emitted from the light-emitting elements, the mask having repetitively formed thereon a predetermined light transmitting or reflecting pattern including two or more of the segments as a unit, M light-receiving elements arranged in a direction perpendicular to the predetermined direction, receiving the lights transmitted through or reflected by the mask and independently outputting signals, and shutters disposed in the optical path from the light-emitting elements to the light-receiving elements and arbitrarily openable-closable at each segment unit constituting the pattern of the mask.

14 Claims, 7 Drawing Sheets

OPTICAL SWITCH ARRAY PROVIDED WITH A MASK HAVING OPENINGS OF A PREDETERMINED PATTERN AND SHUTTERS CORRESPONDING TO THE PATTERN

BACKGROUND OF THE INVENTION

1. Field of the Invention

This invention relates to an optical switch array suitable for effecting the connection of the signal lines of communication network, computers or the like through the medium of a light.

2. Related Background Art

A switch array is an indispensable device in the fields of communications and computers and in particular, a cross bar switch is very useful because of its characteristics.

However, the cross bar switch array is difficult to manufacture if the connection terminals thereof are increased, and it is not easy to make a large-scale switch array even if the present-day semiconductor technique is freely used.

Therefore, the cross bar switch is often used in connecting a small number of terminals.

On the other hand, recently, the optical art tried to make relatively large-scale cross bar switches, and the details thereof are disclosed, for example, in IEEE SPECTRUM, August 1986 and IEEE COMPUTER, June 1987. (P. 50), A. A. Sawchuck et al.

FIG. 1 of the accompanying drawings is a schematic view showing such an optical cross bar switch according to the prior art. In FIG. 1, the reference numerals 9-1, 9-2, 9-3 and 9-4 designate light sources, the reference numeral 92 denotes emitted light beams from the light sources 9-1, etc., the reference numeral 93 designates a shutter array, the reference numeral 94 denotes light beams transmitted through the shutter array 93, and the reference numerals 95-1, 95-2, 95-3 and 95-4 designate photodetectors.

The present example shows an optical cross bar switch in which the number of shutters is 4×4. Signals from respective terminals are supplied to the light sources 9-1, 9-2, 9-3 and 9-4. The emitted light beams 92 from the light sources 9-1, 9-2, 9-3 and 9-4 are widened in a vertical direction and enter the shutter array 93.

In FIG. 1, those portions of the shutter array 93 which are indicated by hatching are light transmitting portions, and the transmitted light beams 94 from these transmitting portions are collected in a horizontal direction and enter the photodetectors 95-1, 95-2, 95-3 and 95-4. Signals from the photodetectors 95-1, 95-2, 95-3 and 95-4 are supplied to respective terminals.

Which terminal should be connected together at this time is determined by which shutter of the shutter array 93 is rendered transmissive.

A description will now be provided of the connection of the light source 9-1 as an example. The signal of the terminal connected to the light source 9-1 is modulated by the light beam emitted from the light source 9-1, and is widened in a vertical direction and enters the first row of the shutter array 93. When as shown in FIG. 1, for example, the shutter in the third column and the first row is a transmitting portion, the incident light beam passes through only this shutter, is collected in a horizontal direction and is detected by the photodetector 95-3.

Thus, the terminal of the light source 9-1 is connected to the terminal of the photodetector 95-3. This also holds true of the connection between other terminals.

However, in the above-described example of the prior art, an increase in the number of terminals connected together results in an increase in the number of the shutters of the shutter array 93 and it becomes difficult to make the optical cross bar switch. Where computers are connected, the connection signal lines of a computer may amount to several tens to about one hundred.

For example, where ten computers each having one hundred connection signal lines are to be connected, a shutter array having 100×10=1000 light sources and photodetectors and 1000×1000=$10^6$ shutters becomes necessary, and it becomes very difficult to make a shutter array having such a huge number of shutters.

SUMMARY OF THE INVENTION

The present invention has as its object the provision of an optical switch array, in which the number of the shutters of the shutter array is not increased substantially even if the number of signal lines connected together is relatively great, and which is easy to manufacture and simple in construction.

The above object of the present invention is achieved by an optical switch array comprising N (N being 2 or greater integer) light-emitting means arranged in a predetermined direction and each emitting a light independently modulated in accordance with an input signal, masking means having N×M (M being 2 or greater integer) segments arranged in the form of a matrix in the predetermined direction and a direction perpendicular thereto and having repetitively formed thereon a predetermined light transmitting or reflecting pattern comprising two or more of the segments as a unit by some of the segments transmitting therethrough or reflecting the lights emitted from the light-emitting means, M light-receiving means arranged in a direction perpendicular to the predetermined direction, receiving the lights transmitted through or reflected by the masking means and independently outputting signals, and shutter means comprising shutters disposed in the optical path from said light-emitting means to the light-receiving means and arbitrarily openable-closable at each segment unit constituting the pattern of the masking means.

DESCRIPTION OF THE PREFERRED EMBODIMENTS

Figure 1:
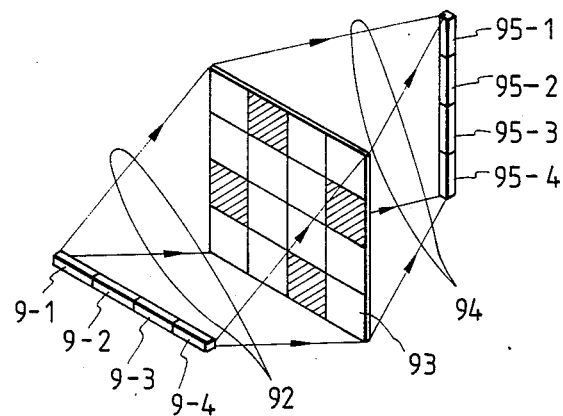
FIG. 1 is a schematic perspective view showing an example of the construction of the optical switch array according to the prior art.
Figure 2:
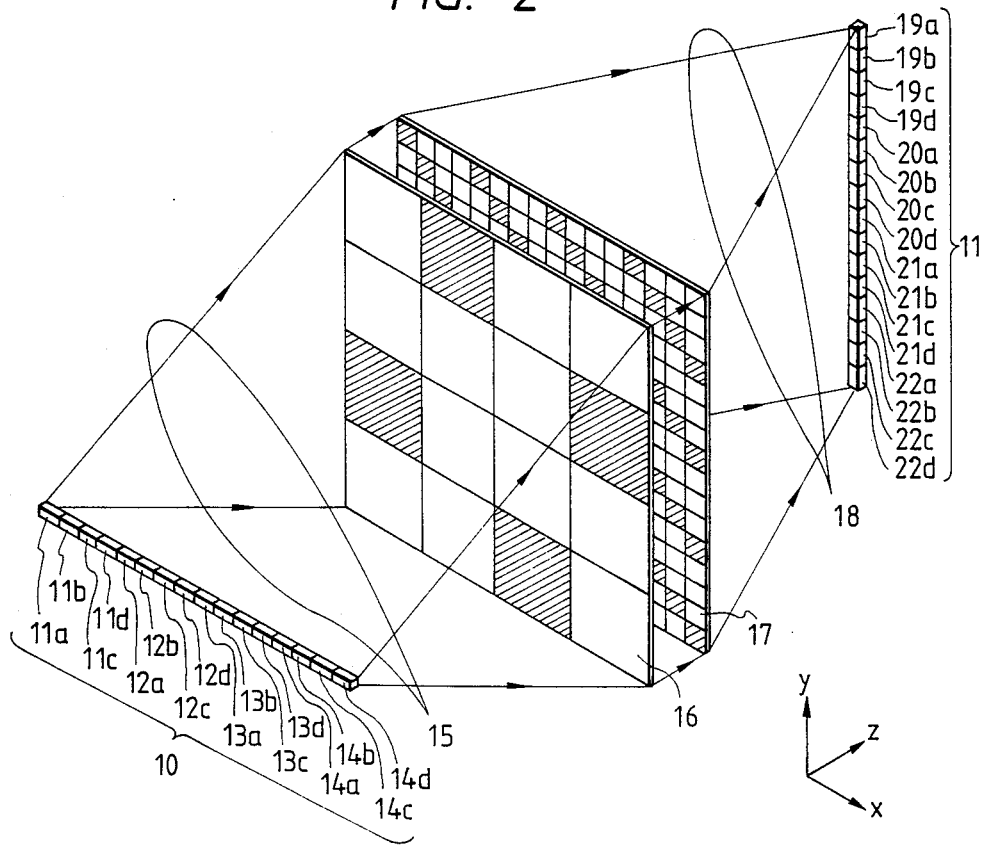
FIG. 2 is a schematic perspective view showing the construction of an embodiment of the optical switch array of the present invention.

FIG. 2 is a schematic perspective view showing an embodiment of the present invention. In FIG. 2, the reference numeral 10 designates light-emitting means, the reference characters 11a, 11b, 11c, 11d, 12a, 12b, 12c, 12d, 13a, 13b, 13c, 13d, 14a, 14b, 14c and 14d denote light sources constituting the light-emitting means 10. These light sources each comprise a light-emitting diode (LED) or a laser diode (LD). The light-emitting means 10 is connected to a first group of signal lines, not shown, having sixteen signal lines. The reference numeral 15 designates light beams emitted from the light sources 11a, 11b, ..., 14d. The reference numeral 16 denotes a shutter array which may be a spatial light modulator using an electro-optical material such as liquid crystal, PLZT or LiNbo₃ or a magneto-optical material such as Bi-substituted YIG, or a display panel which controls the transmittance by the use of electrochromy, liquid crystal or the like. The shutter array 16, if the reflected light therefrom is utilized, may also be a reflection type spatial light modulator which varies the reflectance. The reference numeral 17 designates an opening mask provided with a number of openings in the whole surface thereof. The opening mask 17 may be simply made by forming holes in a metal by mechanical working, or by vapor-depositing Al or Cr on a glass substrate and making an opening pattern thereon by photolithography.

The hatched portions of the shutter array 16 and the opening mask 17 are light beam transmitting portions. The reference numeral 18 denotes light beams transmitted through the shutter array 16 and the opening mask 17. The reference numeral 11 designates light-receiving means, and the reference characters 19a, 19b, 19c, 19d, 20a, 20b, 20c, 20d, 21a, 21b, 21c, 21d, 22a, 22b, 22c and 22d denote photodetectors constituting the light-receiving means 11. These photodetectors are connected to a second group of signal lines, not shown, having sixteen signal lines.

FIG. 2 shows an optical switch array in which the number of terminals is sixteen. The prior-art shutter requires 16×16=256 shutters, while in the present embodiment, the shutter array can be constructed of sixteen shutters as will hereinafter be described.

In the present embodiment, as shown in FIG. 2, sixteen signal lines are connected to the light sources 11a, 11b, ..., 14d, and it is to be understood that each four signal lines are led out from a computer and the signal lines from four computers are connected. For example, 11a, 11b, 11c and 11d are outputs from a computer, 11a and 11b represent data, and 11c and 11d represent addresses.

Actually, the number of signal lines for inputting and outputting data, addresses, etc. from a computer is greater, but herein, for simplicity, a description is provided when the number of such signal lines as four.

Likewise, the light sources 12a, 12b, 12c and 12d have connected thereto the outputs from the second computer, and 12a and 12b represent data and 12c and 12d represent addresses, as is the case with the first computer. It is also to be understood that the light sources 13a, 13b, ..., 14c and 14d are similarly connected.

In such a case, the connection by the present optical switch array is not such that sixteen terminals are connected to any one of the other sixteen terminals, but four signal lines as a unit are connected for each computer.

Accordingly, as regards the connection of four signal lines for a computer, only the connection for each computer may be considered because the pattern is determined as previously described (in the present embodiment, the suffixes a and b represent data and suffixes c and d represent addresses).

For example, it is only the photodetectors 19a, 20a, 21a and 22a that the signal lines representing the data of the first computer may be connected to via light from the light source 11a.

The operation of the present embodiment will now be described. The emitted light beam 15 from the light sources 11a, 11b, ..., 14d modulated in conformity with the signals of the sixteen signal lines are widened only in y direction orthogonal to the direction of arrangement of the light sources 11a, 11b, ..., 14d (x direction) and are caused to enter the shutter array 16. The shutter array 16 has 4×4 shutters. The light beams transmitted through the transmitting portions of the shutter array 16 enter the opening mask 17. The transmitted light beams 18 from the opening mask 17 are collected in x direction and enter the photodetectors 19a, 19b, ..., 22d.

Figure 3A:
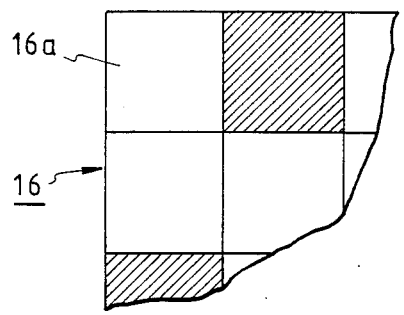
FIGS. 3A and 3B are front views showing portions of a shutter array and an opening mask, respectively, in the embodiment shown in FIG. 2.
Figure 3B:
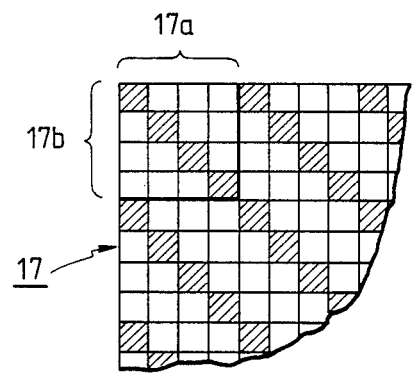

The relation between the shutter array 16 and the opening mask 17 will now be described. FIGS. 3A and 3B are fragmentary enlarged views of the shutter array and the opening mask, respectively, illustrating the relation between the shutter array 16 and the opening mask 17.

FIGS. 3A and 3B show corresponding portions, and the hatched portions are the transmitting portions. There are 4×4=16 segments in one section 17a of the opening mask 17 which corresponds to one shutter 16a of the shutter array 16, and for example, in the present embodiment, the four segments at the diagonal portions of one section are fixed as opening portions (transmitting portions).

The pattern of 4×4=16 segments is repetitively constructed over the entire opening mask 17. For example, the light beam emitted from the light source 11a shown in FIG. 2 is widened in y direction, whereafter it enters the shutter array 16. The shutter array 16 is such that the shutter in the third column and the first row is a transmitting portion and therefore, the incident light beam passes through that portion to the opening mask 17.

The light beam which has entered the opening mask 17 impinges on the corresponding section limited by the transmitting portions of the shutter array 16, i.e., the whole first row of the 4×4 segments, but the opening portion is only the segment in the first column and the first row, and only the light beam which has impinged on this opening portion is transmitted.

Thereafter, the emergent light beam from the opening mask 17 is collected and caused to enter the photodetector 21a, and is connected to the signal line connected to the photodetector 21a. Each four of the photodetectors 19a, 19b, ..., 22c, 22d are connected to a computer or an apparatus, and in some cases, the destination to which they are connected is again that side of the computer which is adjacent to the light-emitting means of the optical switch array, and in some cases, the destination is another device, for example, a memory or the like.

As regards the connection pattern of the signal lines of a computer, where for example, the light sources 11a and 11b represent data and the light sources 11c and 11d represent addresses as previously mentioned, the photodetectors 19a, 19b and 19c, 19d are also likewise connected to the signal lines of the respective data and addresses of the first apparatus. Further, the photodetectors 20a, 20b and 20c, 20d are connected to the signal lines of the respective data and addresses of the second apparatus, and the third and fourth apparatuses are also likewise connected.

Describing again the optical path of the light source 11a, even if among the first row of shutters of the shutter array 16, the shutters in the other columns than the third column are transmitting portions, the pattern of the 4×4 segments of the opening mask 17 is the same in any section corresponding to any shutter and therefore, the opening portion through which the light beam of the light source 11a can be transmitted is only in the first column and the first row of the 4×4 segments.

Accordingly, the photodetectors which the light beam from the light source 11a may enter after it is transmitted through the opening mask 17 are only 19a, 20a, 21a and 22a.

Conversely, it is seen that light beams which may be received by the photodetector 19a are only the light beams emitted from the light sources 11a, 12a, 13a and 14a. This also just holds true of the other light sources and photodetectors.

That is, in the present embodiment, the fact that the connection pattern of the signal lines of a computer does not differ even if the connection is made to any computer or apparatus is utilized to control only the connection between computers or between a computer and other apparatus by the shutter array 16 so that each signal line is automatically connected by the opening mask 17 in accordance with a predetermined connection pattern.

As described above, in the present embodiment, the number of the shutters of the shutter array 16 need not be 16×16=256, but the shutter array can be constructed of 4×4=16 shutters and thus, the number of shutters can be greatly reduced.

Figure 4:
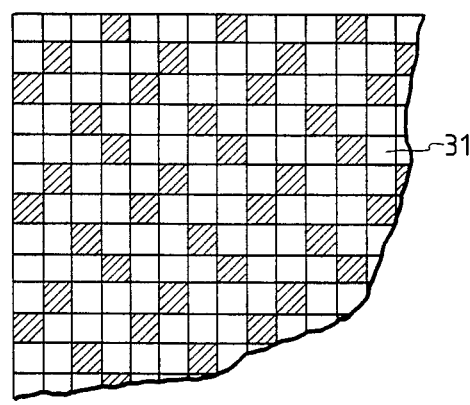
FIG. 4 is a front view showing an example of the opening mask of another pattern.

FIG. 4 is a fragmentary enlarged view of another embodiment of the opening mask according to the present invention. In FIG. 4, the reference numeral 31 designates the opening mask. The method of making this opening mask is the same as the method of making the opening mask shown in FIG. 3B, and the only difference between these opening masks is the arrangement of opening portions in 4×4 segments.

In FIG. 3B, the diagonal portions in 4×4 segments are opening portions, where as in the present embodiment, the opening portions are disposed at such positions as shown in FIG. 4. However, as in FIG. 3B, only one opening portion is provided in each column and each row of the 4×4 segments.

That is, one opening portion is provided in each column and each row of the 4×4 segments, whereby a signal line is connected to a signal line without fail.

Conversely, where there is a plurality of opening portions in each column and each row of the 4×4 segments, for example, where there are opening portions in the first and third columns in the first row, in the embodiment of FIG. 2, the signal of the light source 11a is connected to the terminals of both of the photodetectors 21a and 21c.

Also, where as previously described, the opening mask 31 is applied to the embodiment of FIG. 2, the light beam emitted, for example, from the light source 11a is transmitted through the shutter array 16 and the second mask 31, whereafter it travels toward one of the photodetectors 19c, 20c, 21c and 22c in accordance with the position of the shutter of the transmitting portion of the shutter array 16.

That is, of the light sources 11a, 11b, . . . , 14d, the light sources given the suffix a are connected to those of the photodetectors 19a, 19b, . . . , 22d which are given the suffix c, and this is due to the fact that in the opening mask 31, a similar pattern is repeated over the entire mask.

Likewise, in the connection between the light sources 11a, 11b, . . . , 14d and the photodetectors 19a, 19b, . . . , 22d, a predetermined connection pattern of the suffix c and the suffix b, the suffix d to the suffix c and the suffix a to the suffix d is kept, whereby it is made possible to construct such that even if the computer or apparatus connected is changed, the type of the signal line connected thereto does not change.

A description will now be provided of an optical system for actually coupling the various members in the embodiment of the present invention.

Figure 5A:
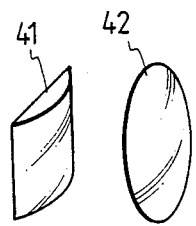
FIGS. 5A and 5B are schematic perspective views showing examples of an optical system used in the embodiment shown in FIG. 2.
Figure 5B:
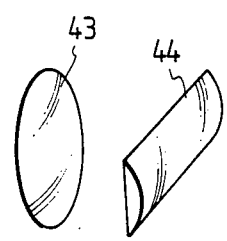

FIGS. 5A and 5B are perspective views showing optical systems used in the embodiment of FIG. 2. FIG. 5A shows a first anamorphic optical system for directing the light beam from the light-emitting means 10 to the shutter array 16, and FIG. 5B shows a second anamorphic optical system for directing the light beam passed through the opening mask 17 to the light-receiving means 11.

In FIG. 5A, the reference numeral 41 designates a first cylindrical lens and the reference numeral 42 denotes a first spherical lens. The first anamorphic optical system constituted by the first cylindrical lens 41 and the first spherical lens 42 acts to effect imaging in the x direction and widen the light beam in the y direction.

In FIG. 5B, the reference numeral 43 designates a second spherical lens and the reference numeral 44 denotes a second cylindrical lens. The second anamorphic optical system constituted by the second spherical lens 43 and the second cylindrical lens 44 acts to widen the light beam in the x direction and effect imaging in the y direction.

Figure 6A:
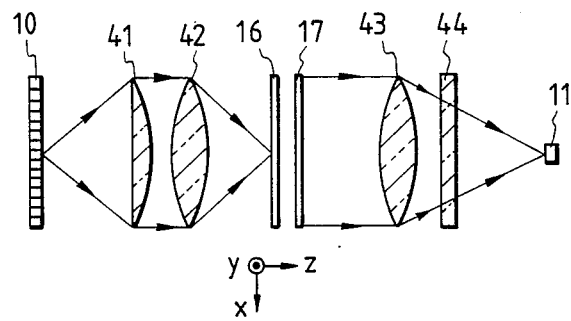
FIGS. 6A and 6B are a schematic plan view and a side view, respectively, illustrating the imaging relation when the optical systems of FIGS. 5A and 5B are used in the embodiment shown in FIG. 2.
Figure 6B:
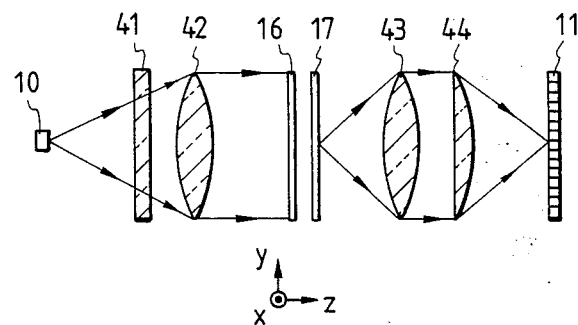

FIGS. 6A and 6B are a plan view and a side view, respectively, showing the manner of imaging when the above-described optical systems are used in the embodiment shown in FIG. 2. In these figures, members identical to those in FIGS. 2 to 5B are given identical reference numerals. As shown, the first anamorphic optical system shown in FIG. 5A is inserted between the light-emitting means 10 and the shutter array 16, and the second anamorphic optical system shown in FIG. 5B is inserted between the opening mask 17 and the light-receiving means 11. The light sources 11a, 11b, . . . , 14d of the light-emitting means 10 and the shutter array 16 are disposed so that they are in conjugate relation with each other in x direction and the light sources 11a, 11b, . . . , 14d lie substantially on the forward focal plane of the first anamorphic optical system in y direction.

Likewise, the opening mask 17 and the photodetectors 19a, 19b, . . . , 22d of the light-receiving means 11 may preferably be disposed so that they are in conjugate relation with each other in the y direction and the opening mask 17 lies substantially on the forward focal plane of the second anamorphic optical system in the x direction.

In the method described above, an inverted image is formed and therefore, the positions at which the emitted light beams 15 from the light sources 11a, 11b, . . . , 14d enter the shutter array 16, etc. differ from what has been previously described, but this is no essential problem, and the order of the signal lines may be changed or the driving signal to the shutter array 16 may be changed. This also holds true of the second anamorphic optical system.

Figure 7:
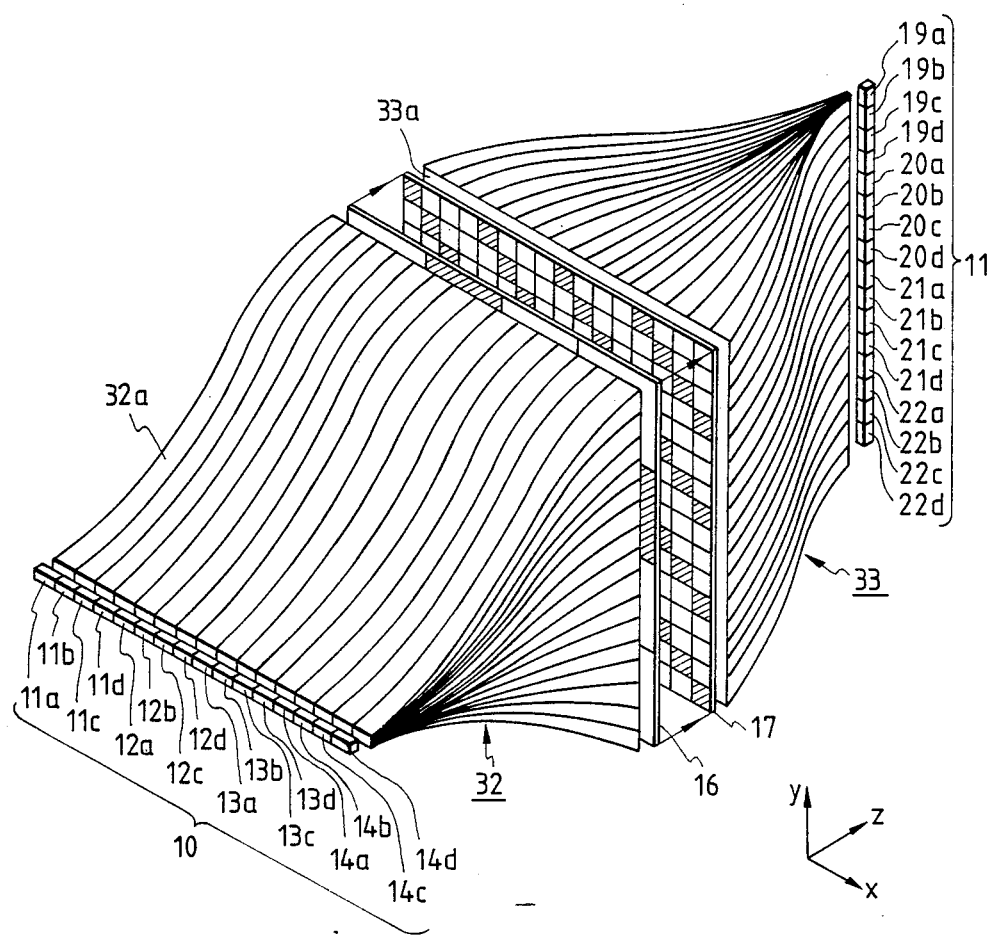
FIGS. 7 and 8 are schematic perspective views showing further embodiments of the present invention.

Also, as shown in FIG. 7, fiber bundles 32 and 33 may be used as optical means for directing light from the light-emitting means 10 to the shutter array 16 and from the opening mask 17 to the light-receiving means 11. In FIG. 7, members identical to those in FIG. 2 are given identical reference characters. The fiber bundle 32 comprises the same number of fiber groups as the light sources which are arranged in the x direction correspondingly to the respective light sources. Each of the fibers constituting these fiber groups has a tapered shape, and one end thereof is opposed to a respective one of the light sources and the other end is opposed to each of the segments arranged in the y direction. Accordingly, the light emitted, for example, from the light source 11a illuminates the entire area of the left end of the shutter array 16 in the y direction with the width of one segment by the fiber group 32a.

Likewise, the fiber bundle 33 comprises the same number of fiber groups as the photodetectors which are arranged in the y direction correspondingly to the respective photodetectors. Each of fibers constituting these fibers groups has a reversely tapered shape, and one end thereof is opposed to a respective one of the segments arranged in the x direction and the other end is opposed to each of the photodetectors. The light transmitted through the segments of the mask 17 which are arranged in the x direction is directed to the photodetectors of the same height in the y direction by each fiber group. For example, the light transmitted through the segments in the first column of the mask 17 is propagated through the fiber group 33a and received by the photodetector 19a.

Figure 8:
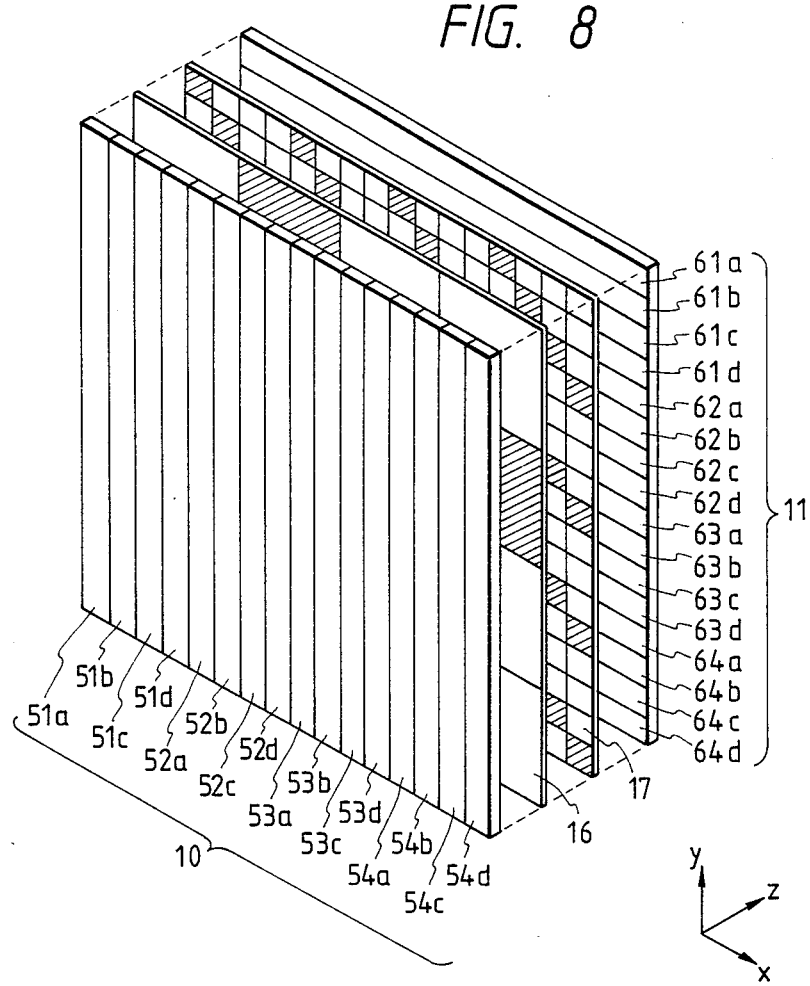

FIG. 8 is a schematic view showing the essential portions of another embodiment of the present invention. In FIG. 8, the reference characters 51a, 51b, 51c, . . . , 54c, 54d designate surface type light sources arranged in the x direction and constituting light-emitting means 10, the reference numeral 16 denotes a shutter array, the reference numeral 17 designates an opening mask, and the reference characters 61a, 61b, . . . , 64c, 64d denote surface type photodetectors arranged in the y direction and constitute light-receiving means 11. The light sources 51a, 51b, . . . , 54d each have a length equal to that of the shutter array 16 and of the opening mask 17 in the y direction. Also, the photodetectors 61a, 61b, . . . , 64d each have a length equal to that of the shutter array 16 and of the opening mask 17 in the x direction.

The present embodiment is characterized in that it does not use an optical system for widening the light beams from the light sources 11a, 11b, . . . , 14d or collecting the light beam from the opening mask 17 as in the embodiment of FIG. 2, but uses surface type light sources and photodetectors having an expanse in themselves. As is apparent from FIG. 8, the light sources 51a, 51b, . . . , 54d, the shutter array 16, the opening mask 17 and the photodetectors 61a, 61b, . . . , 64d can be constructed as a unit, and this leads to the advantage that extreme compactness can be achieved.

The operation of the present embodiment as an optical switch array is similar to that of the FIG. 2 embodiment.

The use of the optical fibers or the surface type light-emitting elements as described in FIG. 7 or 8 is also disclosed in U.S. application Ser. No. 721,949 (filed on Apr. 11, 1985).

In the foregoing description, the light sources such as LED's have been directly modulated in accordance with the light signal, but alternatively, an array-like light modulator or the like cpable of varying the transmittance of any portion which is provided in front of a linear light source emitting a light with a predetermined output may be used as the light-emitting means.

Also, the light sources such as LED's may be placed near a circuit in which a signal is produced, and from there, the light beams may be directed by optical fibers and input to the optical switch array.

Figure 9:
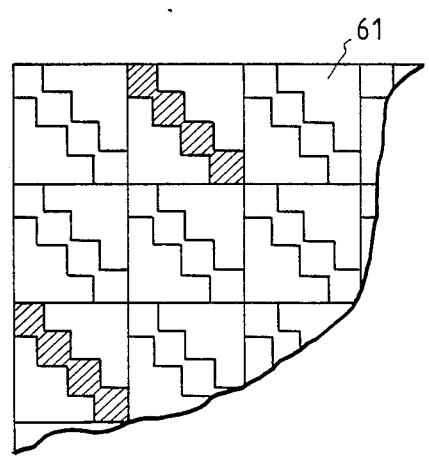
FIG. 9 is a schematic front view showing an example of the shutter array serving also as a mask.

FIG. 9 is a fragmentary enlarged view showing a modification of the shutter array used in the present invention. In FIG. 9, the reference numeral 61 designates the shutter array in which shutters have a shape.

In this embodiment, the shutter array 16 and the opening mask 17 discretely provided in the embodiment of FIG. 8 are made unitary to thereby provide a shutter array 61 comprising a plurality of shutters having a predetermined pattern shape.

The embodiment shown in FIG. 9 corresponds to one in which the shutter array 16 and opening mask 17 shown in FIGS. 3A and 3B are combined together. That is, the opening portions provided in the diagonal portions in the 4×4 segments of the opening mask 17 of FIG. 3B are directly formed in the individual shutters of the shutter array 16 of FIG. 3A to thereby constitute the shutter array 61.

Each shutter of the shutter array 61 has the complicated shape, but this shutter array has the advantage that the number of shutters can be greatly reduced as in the previously described embodiment and the construction of the entire optical switch array becomes simple.

In the above-described embodiments, the number of the first signal lines connected to the light sources 11a, 11b, . . . , 14d and the number of the second signal lines connected to the photodetectors 19a, 19b, . . . , 22d have been sixteen, but the present invention is applicable even if the number of the first signal lines and the number of the second signal lines differ from each other. This will hereinafter be described with reference to FIGS. 10 and 11. In these figures, members identical to those in FIG. 2 are given identical reference characters and need not be described in detail.

Figure 10:
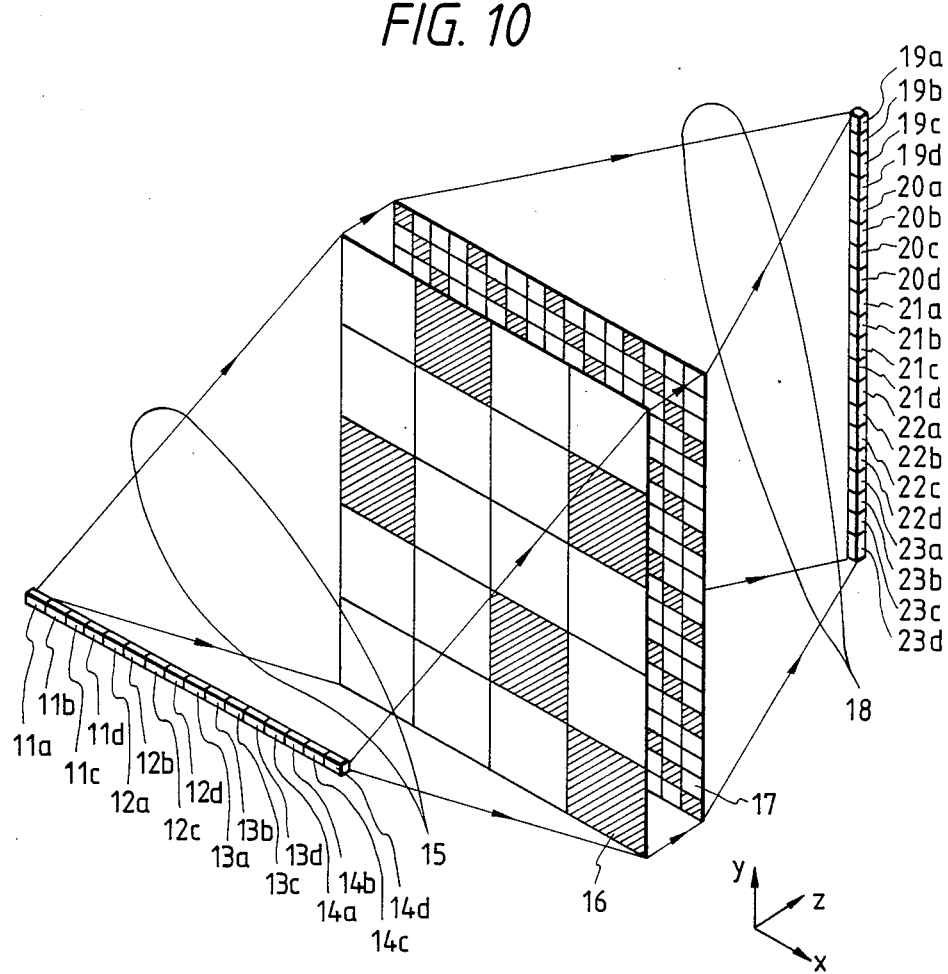
FIGS. 10 and 11 are schematic perspective views showing still further embodiments of the present invention.

The embodiment of FIG. 10 shows a case where the signal lines of four computers are connected to the signal lines of five computers or other apparatuses. That is, in this embodiment, 4×4=16 first signal lines are connected to second signal lines having a different number of, i.e., 4×5=20 signal lines.

Accordingly, the number of the shutters of the shutter array 16 is 4×5=20, and the opening mask is endowed with shapes corresponding thereto. The opening portions in the 4×4 segments of the opening mask are formed with the same pattern as that shown in FIG. 2. The operation will be described with the light source 14a as in example. The light beam of this light source 14a is widened in y direction and is applied to the left end of the fourth row of the shutter array 16, but the shutters lying in transmitting portions are two, i.e., the second column and the fourth column, and the incident light beam is transmitted through both of them.

The light beam transmitted through the shutter array 16 is transmitted through the opening portion in the first column and the first row in the 4×4 segments of the opening mask 17, is collected in x direction and enters the photodetectors 20a and 23a.

That is, the signal lines of the fourth computer including the signal line of the light source 14a of the light-emitting means side are connected to the signal lines of the second and fifth computers or apparatuses of the light-receiving means side. On the other hand, one of the five computers or apparatuses of the light-receiving means side in which no shutter is opened in any one column of the shutter array 16 is not connected.

Figure 11:
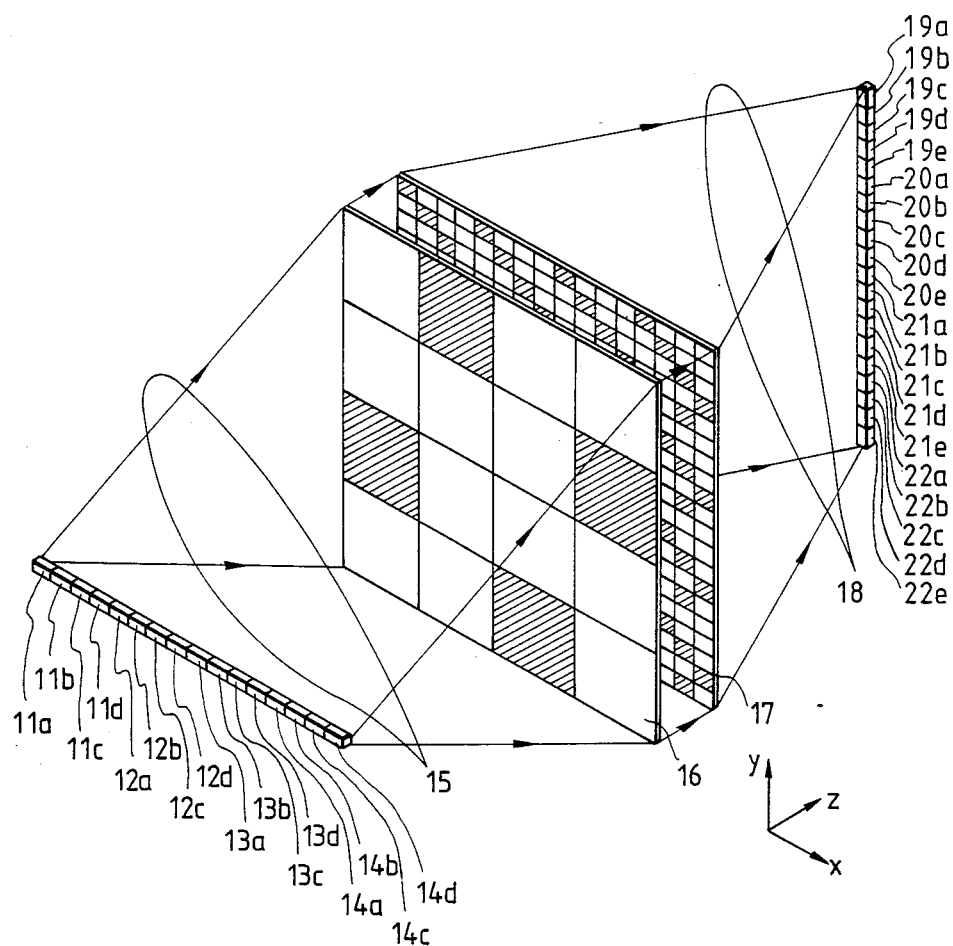

Further, a second embodiment of the case where the number of the first signal lines and the number of the second signal lines differ from each other is shown in FIG. 11. FIG. 11 is a schematic view showing an embodiment in which the number of the segments of the opening mask 17 is 4×5.

In this embodiment, the number of the segments of the opening mask 17 corresponding to the shutters of the shutter array 16 is 4×5 and one computer or apparatus of the light receiving side is endowed with five connected signal lines and therefore, 5×4=20 second signal lines are connected to sixteen first signal lines.

Accordingly, the four signal lines of one computer are connected to the five signal lines of the computer or apparatus of the light-receiving means side and thus, one of the four signal lines is connected to the two signal lines of the light-receiving means side.

Considering, for example, the operation of the light source 14c, the light beam of this light source 14c is transmitted through the shutter in the second column and the fourth row of the shutter array 16 and is applied to the fourth row of the 4×5 segments of the opening mask 17, but since as shown in FIG. 11, the third and fifth columns are the opening portions, the light beam is transmitted only therethrough and enters the photodetectors 20c and 20e.

That is, the signal line of the light source 14c is connected to the signal lines of the photodetectors 20c and 20e. In the opening mask 17, the same pattern is repeated over the entire area thereof and therefore, the operations of the other light sources are performed in just the same way.

As described above, according to the present embodiment, even where the number of the first signal lines and the number of the second signal lines differ from each other, there can be obtained an effect similar to that in the case where the numbers are equal to each other.

The present invention permits various applications besides the above-described embodiments. For example, in the embodiments, the output of the optical switch array has been an electrical signal photoelectrically converted by the light-receiving element, but where at the subsequent stage, the output is to be transmitted in the form of a light or where optical processing is to be effected, the output may be transmitted in the form of a light signal without being photoelectrically converted. Likewise, the light-emitting means is not limited to light sources, but may be the exit end surface of an optical fiber for transmitting the light signal from other apparatus.

The present invention covers all such applications without departing from the scope thereof as defined in the appended claims.

I claim:

1. An optical switch array comprising:
   N light-emitting means arranged in a predetermined direction and each emitting a light independently modulated in accordance with an input signal, wherein N is an integer greater than 1;
   masking means having N×M segments arranged in the form of a matrix in said predetermined direction and in a direction perpendicular thereto, some of said segments performing one of transmitting the lights emitted from said light-emitting means therethrough and reflecting the lights emitted from said light-emitting means, said masking means having repetitively formed thereon a predetermined pattern comprising at least two of said segments as a unit, wherein M is an integer greater than 1;
   M light-receiving means arranged in a direction perpendicular to said predetermined direction, for receiving the lights transmitted through or reflected by said masking means and independently outputting signals; and
   shutter means comprising shutters disposed in the optical path from said light-emitting means to said light-receiving means and arbitrarily openable-closable at each segment unit constituting the pattern of said masking means.

2. An optical switch array according to claim 1, further comprising first optical means for directing the lights from said light-emitting means to said masking means.

3. An optical switch array according to claim 2, wherein said first optical means comprises a first anamorphic optical system provided so as to keep said light-emitting means and said masking means in a conjugate relation in said predetermined direction and so that in a direction perpendicular to said predetermined direction, said light-emitting means are disposed at the forward focus position thereof.

4. An optical switch array according to claim 3, wherein said first anamorphic optical system comprises a spherical lens and a cylindrical lens.

5. An optical switch array according to claim 2, wherein said first optical means is a first fiber bundle comprising a plurality of optical fibers each having one end thereof opposed to said light-emitting means and the other end opposed to the individual segments of said masking means.

6. An optical switch array according to claim 1, further comprising second optical means for directing the lights from said masking means to said light-receiving means.

7. An optical switch array according to claim 6, wherein said second optical means comprises a second anamorphic optical system provided so as to keep said light-receiving means and said masking means in a conjugate relation is a direction perpendicular to said predetermined direction and so that in said predetermined direction, said light-receiving means are disposed at the rearward focus position thereof.

8. An optical switch array according to claim 7, wherein said second anamorphic optical system comprises a spherical lens and a cylindrical lens.

9. An optical switch array according to claim 6, wherein said second optical means is a second fiber bundle comprising a plurality of optical fibers each having one end thereof opposed to said light-receiving means and the other end opposed to the individual segments of said masking means.

10. An optical switch array according to claim 1, wherein said light-emitting means have a length equal to that of said masking means in a direction perpendicular to said predetermined direction, and are constructed integrally with said masking means.

11. An optical switch array according to claim 1, wherein said light-receiving means have a length equal to that of said masking means in said predetermined direction, and are constructed integrally with said masking means.

12. An optical switch array according to claim 1, wherein said shutter means has shutters of a predetermined pattern shape and serves also as said masking means.

13. An optical switch array according to claim 1, wherein said light-emitting means comprise light sources emitting lights in response to an input electrical signal.

14. An optical switch array according to claim 1, wherein said light-receiving means comprise photodetectors for converting the received lights into electrical signals and outputting them.

* * * * *

UNITED STATES PATENT AND TRADEMARK OFFICE
CERTIFICATE OF CORRECTION

PATENT NO. : 4,927,230
DATED : May 22, 1990
INVENTOR(S) : Jun Tokumitsu

It is certified that error appears in the above-identified patent and that said Letters Patent is hereby corrected as shown below:

COLUMN 10:

Line 59, "is" should read --in--.

Signed and Sealed this

Twenty-first Day of July, 1992

Attest:

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 4,927,230
DATED : May 22, 1990
INVENTOR(S) : Jun Tokumitsu

It is certified that error appears in the above-identified patent and that said Letters Patent is hereby corrected as shown below:

Column 1, line 20, "the" should read --the number of--.

Signed and Sealed this

Twenty-fifth Day of August, 1992

Attest:

DOUGLAS B. COMER

*Attesting Officer*  *Acting Commissioner of Patents and Trademarks*